United States Patent [19]

Tornell

[11] 4,059,032
[45] Nov. 22, 1977

[54] DEVICE FOR PRYING LOOSE A PRESSURE COOKER COVER

[76] Inventor: Charles B. Tornell, 46 Bradbury Road., New Castle, Del. 19720

[21] Appl. No.: 724,699

[22] Filed: Sept. 17, 1976

[51] Int. Cl.² .......................................... B25B 27/00
[52] U.S. Cl. ................................................. 81/3 R
[58] Field of Search ................ 81/3 R, 3.1 C, 3.46 R; 254/15, 131

[56] References Cited

U.S. PATENT DOCUMENTS

| | | | |
|---|---|---|---|
| 673,164 | 4/1901 | Fike | 254/15 |
| 2,681,791 | 6/1954 | Hahn | 254/131 |
| 3,680,838 | 8/1972 | Dunn | 254/131 |

Primary Examiner—James L. Jones, Jr.
Assistant Examiner—James G. Smith
Attorney, Agent, or Firm—Bauer, Amer & King

[57] ABSTRACT

A convenience device, advantageously using the mechanical advantage of a lever, to rotate a cover of a pressure cooker relative to its base, to thereby "break" the surface adherence or seal therebetween, preparatory to removal of the otherwise stuck, or hard to disengage, pressure cooker cover.

1 Claim, 4 Drawing Figures

U.S. Patent
Nov. 22, 1977
4,059,032
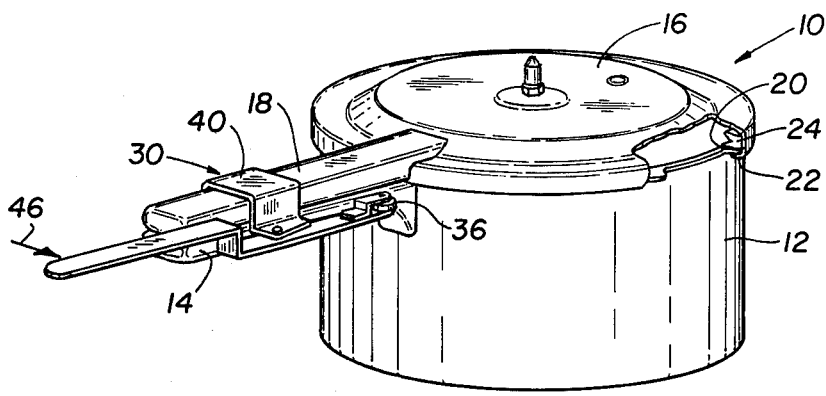
FIG.1
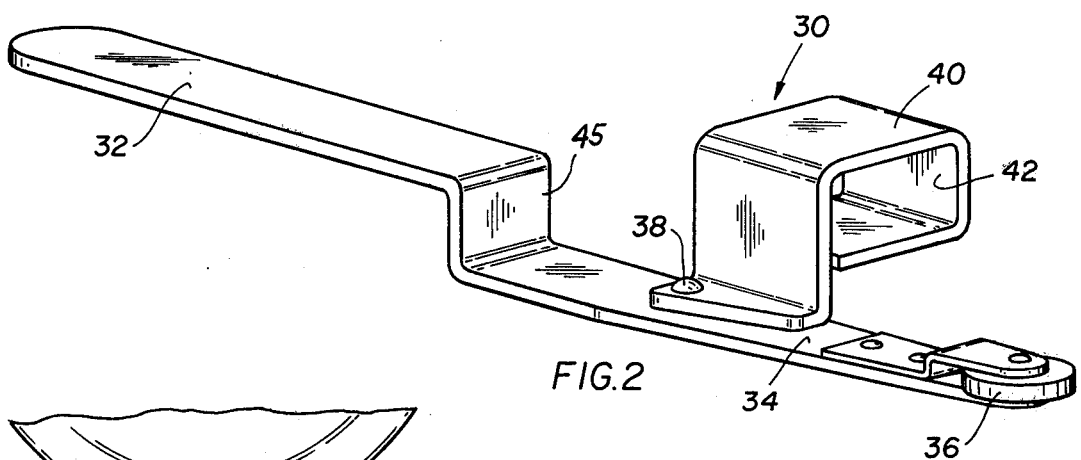
FIG.2
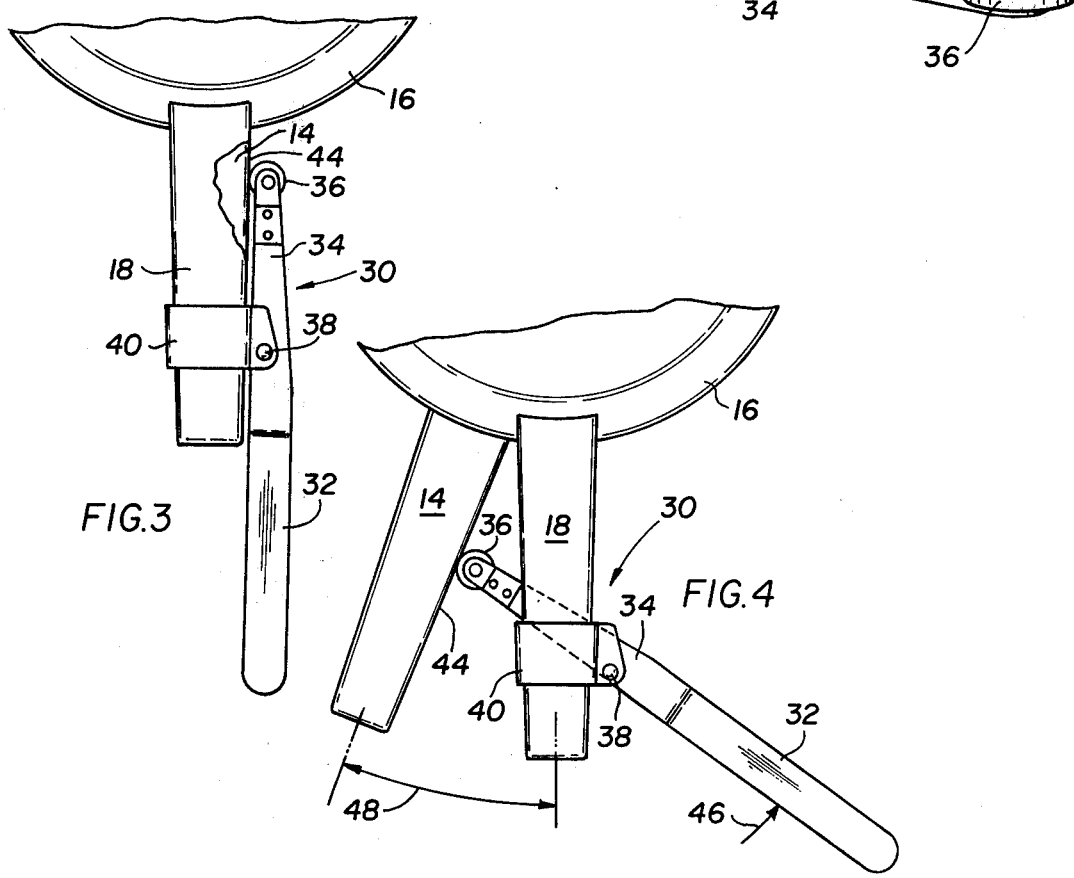
FIG.3
FIG.4

DEVICE FOR PRYING LOOSE A PRESSURE COOKER COVER

The present invention relates generally to pressure cookers, and more particularly to a device, after a typical use of the pressure cooker, for disengaging the cover therefrom, which may typically be stuck thereon because of a pressure-created surface adherence which results during cooking service thereof.

Underlying the present invention is the recognition that the pressure that is used internally of a pressure cooker also inadvertently gives rise to a surface frictional adherence between the cooker and its cover and that this can be effectively "broken" or released, preparatory to removing the cover therefrom, not by attempting to lift the cover from its support surface or edge, but by urging it through rotation relative to this edge. More particularly, such rotational traverse applies a shearing force between the adhering surfaces, and thus is effective to separate these surfaces, even though the force is of a nominal extent. In fact, it is far less than the force that would be required to move the cover directly off of the cooker. The nominal, but effective shearing force, also in practice has been found to obviate any damage to the seal gasket or other pressure cooker structure.

In contrast to the above, prior art efforts to facilitate removal of the pressure cooker cover are believed to have been directed to effectuating direct lifting of the cover from its support edge, using a mechanical advantage or the like, and have not, for this reason, been entirely satisfactory.

Broadly, it is an object to provide an improved pressure cooker cover-prying device overcoming the foregoing and other shortcomings of the prior art. Specifically, it is an object to employ a lever-type device, having a significant mechanical advantage, to force the cover through a rotatable traverse on the stationary cooker, and thus cause its disengagement therefrom.

A cover-releasing or prying device demonstrating objects and advantages of the present invention is intended for a pressure cooker of the type having a cylindrical cooking member and a circular cover for same, each with a laterally extending handle, said device being adapted to removingly release said cover from its sealed engagement with said cooking member. The within cover-releasing device includes an elongated body operatively arranged adjacent the cooking member handle. The elongated body of the within device has a gripping handle at its proximal end and a bearing member at its distal end, said bearing member being positioned in contact with said cooking member handle preparatory to using the device. More particularly, this positioning is, in turn, achieved using a positioning member adapted to be mounted on the cover handle and having a depending leg thereof pivotally connected to the elongated body. As a consequence, the urging of the elongated body through a pivotal traverse pries the cover from the cooking member by causing relative rotative movement therebetween.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a pressure cooker having a device for removing the cover thereof according to the present invention, in the illustration of which a portion of the cover is broken away and shown in section to better illustrate structural details thereof;

FIG. 2 is an isolated perspective view of the device hereof which is advantageously used to pry apart the cover from the pressure cooker;

FIGS. 3 and 4 are partial plan views illustrating, in sequence, the manner in which the cover-prying device hereof achieves its function.

Shown in the drawings is a pressure cooker, generally designated 10, which, as generally understood, includes a cooking member or pot-like base 12 having its own integrally connected, laterally extending handle 14, and a cover or closure 16 for the pot 12 which also has its own laterally extending handle 18. As generally understood, pot 12 has an upper edge 20 bounding an opening into the cooking compartment which, during the cooking interval has seated on it the cover 16 which has a C-shaped lip 22 formed about an elastomeric gasket which cooperates with the edge 20 to form a seal, as at 24, where the elastomeric surface seats against the edge 20. Seal 24 contributes to the ability to raise the pressure within the cooking compartment of the pot 12 so that the boiling of fluid occurs at a higher, and thus more effective cooking temperature, all in a manner which is well understood. The foregoing, however, renders it difficult to remove cover 16 from the pot 12 after cooking service of the pressure cooker 10, since it is necessary, in order to remove the cover 16 to "break" the seal or pressure-created surface adherence at location 24. In accordance with the present invention, this is readily achieved using the cover-prying device 30, shown in isolated perspective in FIG. 2.

At this point it should be noted that underlying the present invention is the recognition that cover 16 can be readily disengaged from the pot 12, or more particularly from the edge 20 of pot 12, not by being lifted therefrom but rather by being rotated in relation thereto. Relative rotative movement of cover 16 relative to pot 12 will apply a shear force to the adhered together surfaces 20, 24. The sliding movement of surface 24 over the stationary surface 20 in response to the shear force effectively "breaks" the seal or frictional attraction between these surfaces, and thus releases the cover 16 for removal.

The effectiveness of the cover-prying device 30 hereof also advantageously uses the two laterally extending handles 14 and 18 of the pressure cooker 10 in order to place the device 30 in proper position for prying or urging the cover 16 through rotational movement relative to the pot 12. In this connection, device 30 includes an elongated body which presents a handle 32 at its proximal end and, at its opposite distal end 34, has a rotatable bearing member 36. Pivotally mounted, as at 38 on the distal end 34, is a positioning or mounting bracket 40 having a mounting opening 42 therethrough appropriately sized to accommodate the cover handle 18. More particularly, and as may be best understood by progressive examination of FIGS. 1, 3 and 4, proper use of the device 30 contemplates slipping the mounting bracket 40 over the cover handle 18. The vertically oriented connecting section 45 (see FIG. 2) in the body of the device 30 effectively then aligns the distal end 34 adjacent the handle 14. In this connection, as generally understood, during use of the pressure cooker 10 the handles 14 and 18 are placed in superposed relation, not only so that these handles occupy the same vertical plane and thus add to the convenience of the use of the pressure cooker 10, but also to establish the pressure seal between the cover 16 and pot 12. As a consequence of the foregoing, the distal end 34 which is mounted in depending relation on the mounting bracket 40, as already indicated, is located adjacent the handle 14 and, more particularly, the bearing member 36 is thus in physical contact with the side edge 44 of handle 14. Gripping handle 32, the user then pushes the handle in a counterclockwise direction 46 relative to the pivot 38, a movement which of course is resisted by virtue of the contact of bearing member 36 against the side edge 44 of handle 14. Instead, the force 46 results in mounting bracket 40 pulling handle 18 through a pivotal traverse 48, all as clearly illustrated in FIG. 4. Following this pivotal traverse or prying movement 48 of cover 16, device 30 is readily removed from handle 10, preparatory to removal of the cover 16 from the pot 12.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A convenience device for a pressure cooker of the type having a cylindrical cooking member and a circular cover for same, each with a laterally extending handle, said device being adapted to removingly release said cover from its sealed engagement with said cooking member and comprising an elongated body operatively arranged in a horizontal plane adjacent said cooking member handle, said elongated body having a gripping handle at its proximal end and a bearing member at its distal end in contact with said cooking member handle, and a positioning and pulling member adapted to be mounted on said cover handle with a depending leg thereof pivotally connected to said elongated body, whereby urging said elongated body through a pivotal traverse pries said cover from said cooking member by causing rotative movement of said cover relative to said cooking member, wherein said positioning member is in the specific form of a closed loop body adapted to accommodate the cover handle in projected relation therethrough.

* * * * *